United States Patent [19]

Lazzari

[11] Patent Number: 5,764,447

[45] Date of Patent: Jun. 9, 1998

[54] HIGH RELUCTANCE MAGNETIC HEAD

[75] Inventor: Jean-Pierre Lazzari, Corenc, France

[73] Assignee: Silmag, Saint Egreve Cedex, France

[21] Appl. No.: 794,910

[22] Filed: Feb. 4, 1997

[30] Foreign Application Priority Data

Mar. 19, 1996 [FR] France ................................ 96 03390

[51] Int. Cl.⁶ .................................................. G11B 5/127
[52] U.S. Cl. ........................................ 360/113; 360/125
[58] Field of Search ........................... 360/113, 125–127

[56] References Cited

U.S. PATENT DOCUMENTS

| | | | |
|---|---|---|---|
| 5,274,520 | 12/1993 | Matsuzono et al. | 360/113 |
| 5,434,733 | 7/1995 | Hesterman et al. | 360/113 |
| 5,648,884 | 7/1997 | Lazzari | 360/113 |

FOREIGN PATENT DOCUMENTS

| | | |
|---|---|---|
| 0 475 397 | 3/1992 | European Pat. Off. . |
| 0 651 374 A2 | 3/1995 | European Pat. Off. . |
| 0 669 607 | 8/1995 | European Pat. Off. . |

*Primary Examiner*—John H. Wolff
*Attorney, Agent, or Firm*—Oblon, Spivak, McClelland, Maier & Neustadt, P.C.

[57] ABSTRACT

A high reluctance magnetic head is disclosed.
According to the invention, the concentrators are separated from the pole pieces by an amagnetic layer incorporating more particularly a conductive layer.
The application is directed to magnetic recording.

3 Claims, 2 Drawing Sheets

HIGH RELUCTANCE MAGNETIC HEAD

TECHNICAL FIELD

The present invention relates to a high reluctance magnetic head. It has an application in information recording.

PRIOR ART

The invention essentially applies to so-called thin film, horizontal heads. Such a head is shown in the attached. In FIG. 1 it is possible to see in section a head having a semiconductor substrate 10, e.g., of silicon, in which has been etched a recess 12. Within said recess has been electrolytically formed a rear magnetic layer 14 and this has been extended by two vertical posts $16_1$, $16_2$. A coil 18 surrounds the posts and is embedded in an insulating layer 20. The magnetic circuit is completed by a front magnetic piece incorporating two pole pieces $22_1$, $22_2$ separated by an amagnetic spacer 24. A magnetoresistant element MR is placed beneath the amagnetic spacer 24. The head is moved in front of a magnetic support 30, where the information to be read or written are recorded.

Such a head is described in FR-A-2 645 314 (or the corresponding U.S. Pat. No. 5,225,716).

The operation of said device is as follows.

On writing, the current flowing in the coil 18 creates a magnetic field and consequently an induction in the magnetic circuit. The field lines which spread out around the spacer induce a magnetization in the support 30.

On reading, magnetic information recorded in the support 30 produces a magnetic reading field and consequently an induction in the magnetic circuit and which is partly closed across the magnetoresistant element MR. This leads to a magnetization rotation in said element, which will bring about a variation in its resistance.

Although satisfactory in certain respects, such heads suffer from a disadvantage linked with the relative weakness of the reading signal. This weakness is essentially due to the fact that the magnetic reading flux is not completely closed across the magnetoresistant element MR. Thus, on reading, the magnetic flux from the support 30 is closed taking two different paths, as illustrated in the attached FIG. 2, namely:

one path (a) taken by the lower pole piece (14), a path (b) which is closed across the magnetoresistant element MR Therefore part of the magnetic flux is unused in the reading stage.

To obviate this disadvantage, FR-A-2 657 189 recommends opening the magnetic circuit in such a way that the aforementioned path (a) is interrupted, so that preference is then given to path (b). In practice, said document recommends eliminating the magnetic posts $16_1$, $16_2$ or even eliminating the rear magnetic piece 14. However, the writing signal is greatly weakened or attenuated by such upheavals to the magnetic circuit.

EP-A-475 397 also recommends opening the magnetic circuit, but in a different way. It recommends producing a gap in the rear magnetic piece, or two auxiliary gaps in the posts, while adding a second magnetic circuit used in reading and able to reinforce the flux directed towards the magnetoresistant element. This solution is relatively complex and makes the production process for the head both long and costly.

The object of the present invention is to obviate these disadvantages. It recommends increasing the reluctance of the magnetic circuit, but in a simpler way.

DESCRIPTION OF THE INVENTION

The invention is firstly applicable to heads having, in addition to the means shown in FIG. 1, two flux concentrators located above the two posts and magnetically coupled to the two pole pieces. The invention then recommends separating said concentrators from the pole pieces by an amagnetic layer. Such a layer can be easily deposited during production following the formation of the concentrators. The magnetic decoupling brought about in this way eliminates the numerous magnetic leaks, which disturb the operation of the prior art heads with auxiliary gaps.

More specifically, the present invention relates to a magnetic head incorporating a magnetic circuit with two magnetic concentrators and two pole pieces separated by an amagnetic spacer and a magnetoresistant element located beneath the amagnetic spacer, said head being characterized in that the two concentrators are separated from the two pole pieces by an amagnetic layer incorporating at least one conductive layer.

The amagnetic layer can have a thickness between a fraction of a microns and a few microns.

The amagnetic layer can be constituted by an insulating layer (e.g. of silica) covered with a conductive layer (of copper, chromium, tungsten, etc.). The conductive layer will serve as the electrode in an electrolytic growth stage for the pole pieces.

As the amagnetic layer is present in the two passages separating the concentrators from the pole pieces, the structure is symmetrical and the reading signal is also symmetrical.

DETAILED DESCRIPTION OF AN EMBODIMENT

Figure 6:
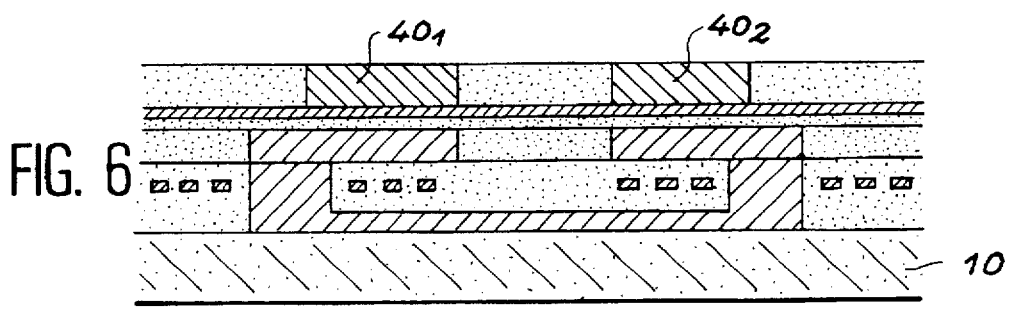
FIG. 6 illustrates the electrolytic growth operation for part of the upper magnetic piece.
Figure 7:
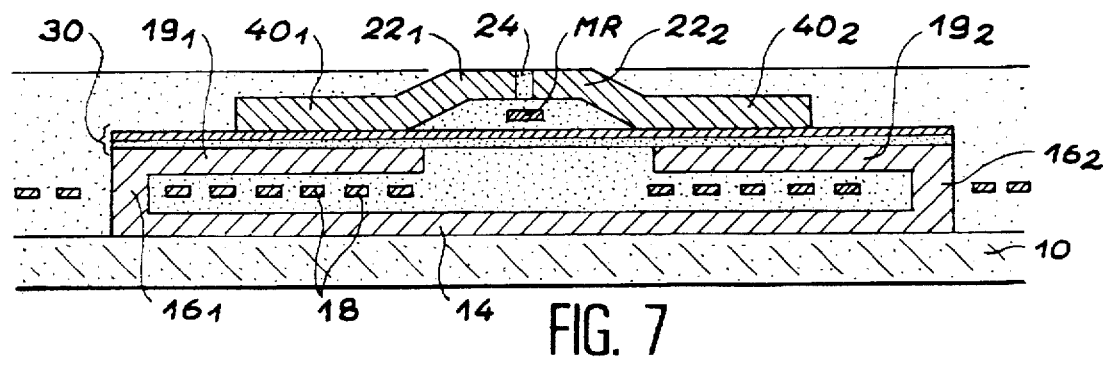
FIG. 7 illustrates a finished magnetic head according to the invention.

FIGS. 3 to 6 show subassemblies obtained during the production of a magnetic head according to the invention, the finished head being illustrated in FIG. 7.

Figure 1:
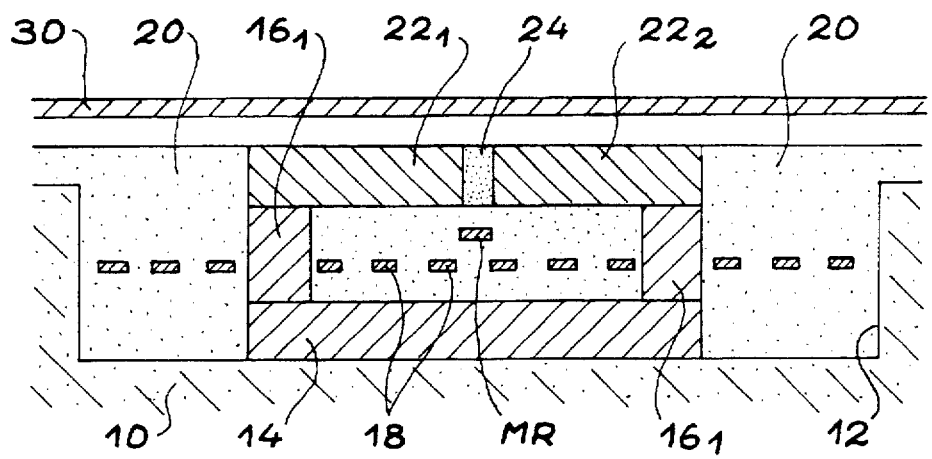
FIG. 1, already described, diagrammatically illustrates a thin film horizontal magnetic head.
Figure 2:
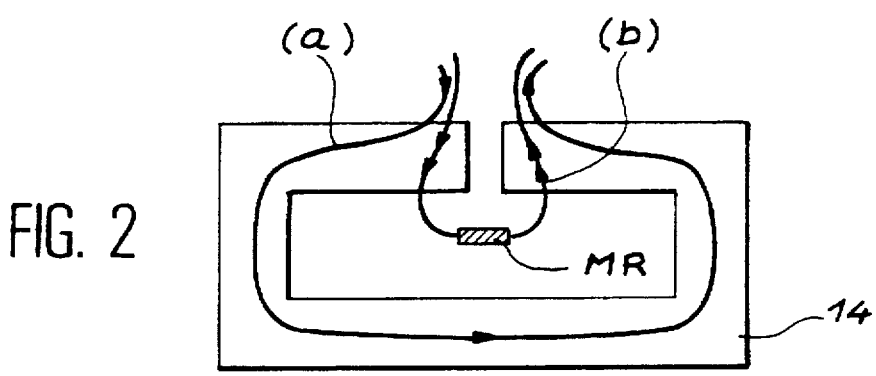
FIG. 2, already described, shows the magnetic fluxes during reading.
Figure 3:
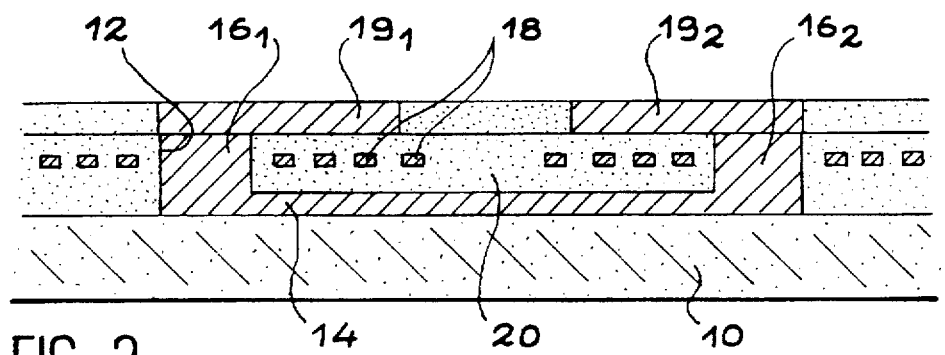
FIG. 3 illustrates a first subassembly obtained after producing concentrators.

FIG. 3 shows a first subassembly having on a substrate 10 a rear magnetic piece 14, two posts $16_1$ and $16_2$, two concentrators $19_1$, $19_2$ and a conductive winding 18 embedded in an insulator 20. The concentrators can have a random shape, but the width of said parts towards the center of the head is smaller than level with the posts.

Figure 4:
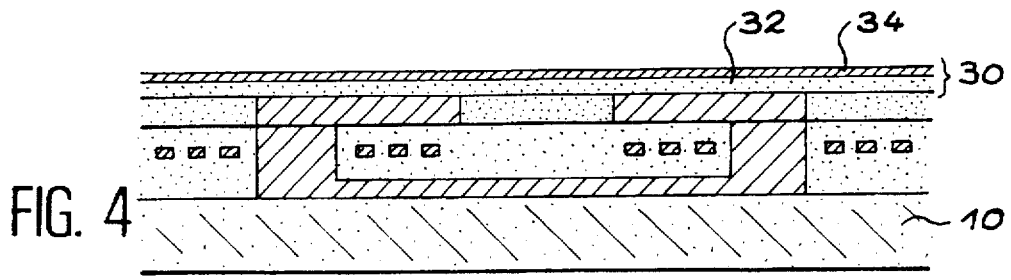
FIG. 4 illustrates the deposition of an amagnetic layer on the concentrators.
Figure 5:
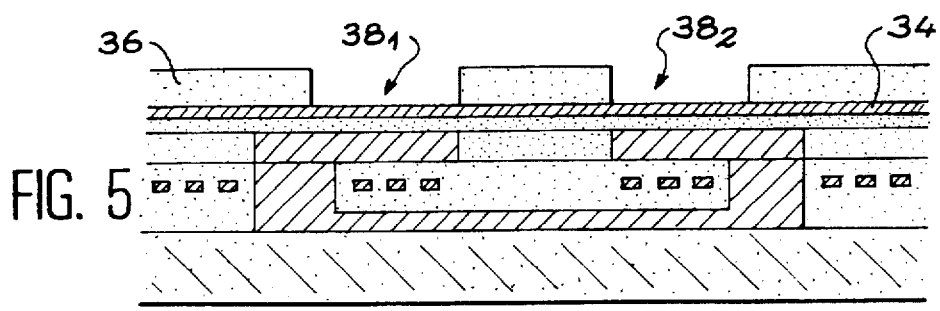
FIG. 5 shows a supplementary stage.

To obtain a high reluctance in the magnetic circuit, deposition then takes place, in the manner illustrated in FIG. 4, of an amagnetic layer 30 which in the illustrated variant, comprises an insulating layer 32, e.g., of silica, covered with a metal layer 34, e.g., of tungsten.

On said assembly is then deposited (cf. FIG. 5) an insulant or resin layer 36, in which are etched two recesses $38_1$ and $38_2$.

Taking the metal layer 34 as the electrode, said recesses are filled by electrolytic growth in order to obtain two magnetic pieces $40_1$, $40_2$, as shown in FIG. 6.

The process then continues with known operations, namely the formation of a magnetoresistant element, the formation of an insulating wall and the growth of pole pieces on either side of the wall. The head finally obtained is shown in FIG. 7 with its two pole pieces $22_1$, $22_2$, separated by the amagnetic spacer 24 and the magnetoresistant element MR. The latter is placed beneath the spacer, either beneath the pole pieces, as illustrated, or between the latter.

I claim:

1. Magnetic head having a magnetic circuit with two magnetic concentrators, two pole pieces separated by an amagnetic spacer and a magnetoresistant element positioned below the amagnetic spacer, characterized in that the two concentrators ($19_1$, $19_2$) are separated from the two pole pieces by an amagnetic layer incorporating at least one metal layer.

2. Magnetic head according to claim 1, characterized in that the amagnetic layer comprises an insulating layer covered by said metal layer.

3. Magnetic head according to claim 1, characterized in that the amagnetic layer has a thickness between a fraction of a micron and a few microns.

* * * * *